US007764973B2

(12) United States Patent
Shaffer et al.

(10) Patent No.: US 7,764,973 B2
(45) Date of Patent: Jul. 27, 2010

(54) CONTROLLING PLAYBACK OF RECORDED MEDIA IN A PUSH-TO-TALK COMMUNICATION ENVIRONMENT

(75) Inventors: Shmuel Shaffer, Palo Alto, CA (US); Steven L. Christenson, Campbell, CA (US)

(73) Assignee: Cisco Technology, Inc., San Jose, CA (US)

(*) Notice: Subject to any disclaimer, the term of this patent is extended or adjusted under 35 U.S.C. 154(b) by 929 days.

(21) Appl. No.: 11/558,809

(22) Filed: Nov. 10, 2006

(65) Prior Publication Data

US 2008/0114600 A1 May 15, 2008

(51) Int. Cl.
*H04W 4/10* (2009.01)

(52) U.S. Cl. ...................................................... 455/520

(58) Field of Classification Search ....................... None
See application file for complete search history.

(56) References Cited

U.S. PATENT DOCUMENTS 7,639,634 B2 * 12/2009 Shaffer et al. ........... 455/420 X
2005/0215273 A1 * 9/2005 Ito ............................. 455/518
2006/0040695 A1 * 2/2006 Yoon et al. .................. 455/519
2007/0155415 A1 * 7/2007 Sheehy et al. ............... 455/518

FOREIGN PATENT DOCUMENTS

EP 1761083 A2 * 3/2007

* cited by examiner

*Primary Examiner*—Philip J Sobutka

(74) *Attorney, Agent, or Firm*—Schwegman, Lundberg & Woessner, P.A.

(57) ABSTRACT

In one embodiment a method is provided which comprises recording a push-to-talk communication session comprising media segments, each media segment being associated with an endpoint device from which the media segment originated. A playback request for playback of at least one recorded media segment at an adjusted playback speed may be received and, in response to the playback request, a playback speed of the at least one recorded media segment may be adjusted relative to another recorded media segment. The recorded media including the segment with the adjusted playback speed may then be provided at a requesting endpoint device.

25 Claims, 7 Drawing Sheets

CONTROLLING PLAYBACK OF RECORDED MEDIA IN A PUSH-TO-TALK COMMUNICATION ENVIRONMENT

FIELD

This application relates to playback of recorded media in a push-to-talk communication environment.

BACKGROUND

In a push-to-talk communication environment, a plurality of users or speakers joins a common channel, for example a VTG (Virtual Talk Group) to communicate with one another. Typically, the communication channel is configured such that only one speaker is allowed to speak at a time. Thus, speech which is audible in such a channel generally comprises a plurality of media segments (e.g. portions of speech) from respective speakers which media segments are appended serially one media segment after another. The communication in such a push-to-talk environment is therefore generally ordered and is suitable for safety and security operations.

Speech of safety and security operations is usually recoded in order to facilitate forensic analysis of events. The same recording can be used by latecomers who join the operation or session (e.g. log onto the VTG) after it has started, in order to inform or notify the latecomers about what has previously transpired. Operations are usually managed by one or more “principals”. This individual is generally the highest ranking person present, or a specialist who is recognized for his understanding or authority; usually what he says carries the key actions or content. As a new user joins an operation, he or she typically wants to understand what had previously transpired in the event.

The user can invoke the replay mechanism and listen to the replay of all that had been said prior to his joining. If the new user is pressed for time, he may choose to listen only to the media segments (e.g. voice clips or speech portions) of the principals. This, however, has the disadvantage that he could miss a comment or question from one of the other speakers. The user may speed up the whole replay, but this may detract from his ability to focus on the principal’s messages. Yet another option is to modify the replay speed continually, for instance slowing down the voice of the principal and speeding up the reply of the spoken statements of the other speakers. This may shorten the time required to listen to the recorded message but may not be practical when the new user needs to cater to unfolding events.

BRIEF DESCRIPTION OF DRAWINGS

Embodiments are illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of example embodiments.

Overview

In one embodiment a method is provided which comprises recording a push-to-talk communication session comprising media segments, each media segment being associated with an endpoint device from which the media segment originated. A playback request for playback of at least one media segment at an adjusted playback speed may be received and, in response to the playback request, a playback speed of the at least one media segment may be adjusted relative to another media segment. The recorded media segments including the media segment with the adjusted playback speed may then be provided at a requesting endpoint device.

Example Embodiments

Figure 1:
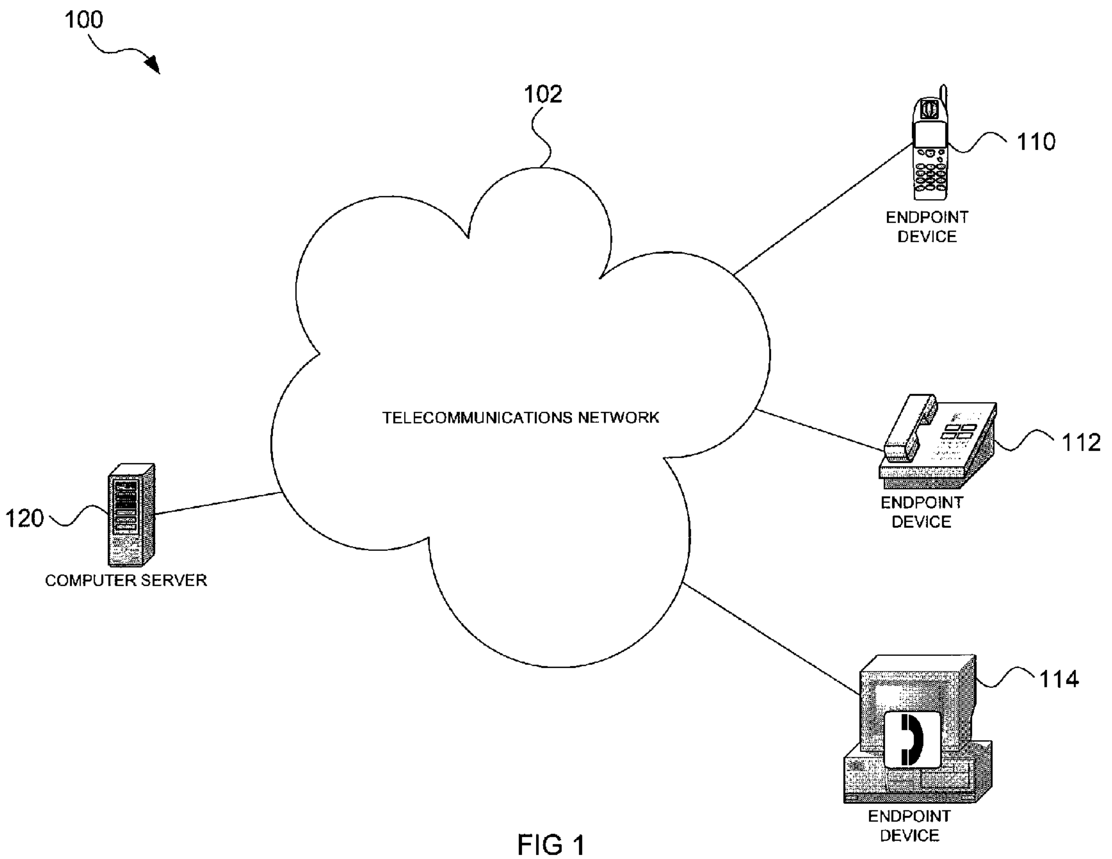
FIG. 1 shows a schematic representation of a system, in accordance with an example embodiment, to control playback of recorded media in a push-to-talk communication environment.

FIG. 1 shows a system 100, in accordance with an example embodiment, to control playback of recorded media in a push-to-talk communication environment. The system 100 is operable to associate respective media segments with respective participants or speakers (or with endpoint devices of respective speakers) and to adjust playback speed of at least one media segment in accordance with priority criteria assigned to the speaker or endpoint device associated with that media segment.

The system 100 may include a telecommunications network 102 which may include the Internet or may be in the form of a dedicated push-to-talk communication network. It is to be appreciated that the telecommunications network 102 may be configured for handling any one or more push-to-talk compatible communication protocols such as unicast, multicast and the like.

The system 100 may further include a plurality of multimedia endpoint devices (e.g. endpoint devices). The term “multimedia endpoint device” includes any device having push-to-talk capabilities, e.g. a telephone, a land mobile radio (LMR), a PDA, a computer with a soft push-to-talk application, and the like. The endpoint devices are shown by way of example to be in the form a mobile telephone 110, an IP (Internet Protocol) telephone 112, for example a VoIP (Voice over IP) telephone, and a computer with a soft push-to-talk application 114. The endpoint devices 110 to 114 may be operable to communicate with one another via a common channel, for example in a VTG. The endpoint devices 110 to 114 may be operable to transmit speech or any other media from speakers (e.g. users of the respective endpoint devices 110 to 114) in a VTG to be listened to or played back by other users of the VTG. It is to be appreciated that three example endpoint devices 110 to 114 are shown for ease of illustration only, and the system 100 may include any number of endpoint devices. Further, in example embodiments, the endpoint devices may also communicate data other than voice data.

The system 100 may further include a computer server 120 which may be configured for hosting or otherwise accommodating push-to-talk communication. The computer server 120 may thus be in the form of an IPICS server (IP Interoperability and Collaboration System) available from Cisco Systems Inc. For example, the computer server 120 may be operable to host one or more VTGs which are accessible by the endpoint devices 110 to 114 for push-to-talk communication with one another. It is to be borne in mind that although this example embodiment is described by way of example with reference to an IPICS server, it is applicable in any push-to-talk communication servers or systems.

Figure 2:
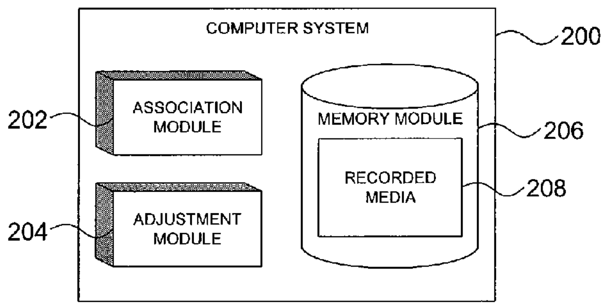
FIG. 2 shows a high-level schematic representation of a computer system, in accordance with an example embodiment, to control playback of recorded media in a push-to-talk communication environment.

Referring now to FIG. 2, a high level representation of an example computer system 100 is shown. The computer system 100 is not necessarily consolidated into one device, and may be distributed among a number of devices. The computer system 100 comprises a plurality of conceptual modules, which corresponded to functional tasks performed by the computer system 100. More specifically, the computer system 100 comprises an association module 202 which is operable to associate respective media segment (e.g. portions of recorded speech) with the respective speakers (or with the endpoint device 110 to 114 used by a particular speaker) from which the portion of recorded speech originated. The association module 202 may also assign a priority to an endpoint associated with role performed by a person in a virtual talk group.

The computer system 100 may thus include a memory module 206, for example a hard disk drive or the like, on which the media (represented schematically by reference numeral 208) e.g. speech or other media received from the endpoint devices 110 to 114 is recorded or recordable for later playback. The media 208 which is recorded on the memory module 206 may be in the form of a single continuous audio clip or stream comprising individual media segments from the various speakers, the media segments being sequentially appended or added one after another to form the single audio clip or recording. The association module 202 may be operable to append or annotate data indicative of the speaker or originator (e.g. an identifier of the endpoint device 110 to 114 from which the speech originated) of each media segment to the recorded audio clip 208, thereby associating the media segments with the respective speakers.

The computer system 100 further includes an adjustment module 204 which is operable to adjust playback speed of the media 208, specifically media segments 208, in accordance with priority criteria assigned to the speaker associated with that media segment. Differently stated, the adjustment module 204 may be operable to determine from which speaker or endpoint device 110 to 114 a media segment 208 originated and automatically adjust the playback speed of each media segment 208 in accordance with priority criteria assigned to the respective speakers.

It is to be understood that the computer system 100 in accordance with an example embodiment may be embodied wholly by the computer server 120, partially by the computer server 120 and partially by one or more endpoint devices 110 to 114, or wholly by one or more of the endpoint devices 110 to 114. Thus, the functional modules 202 and 204 may be distributed among remote devices or systems.

Figure 3A:
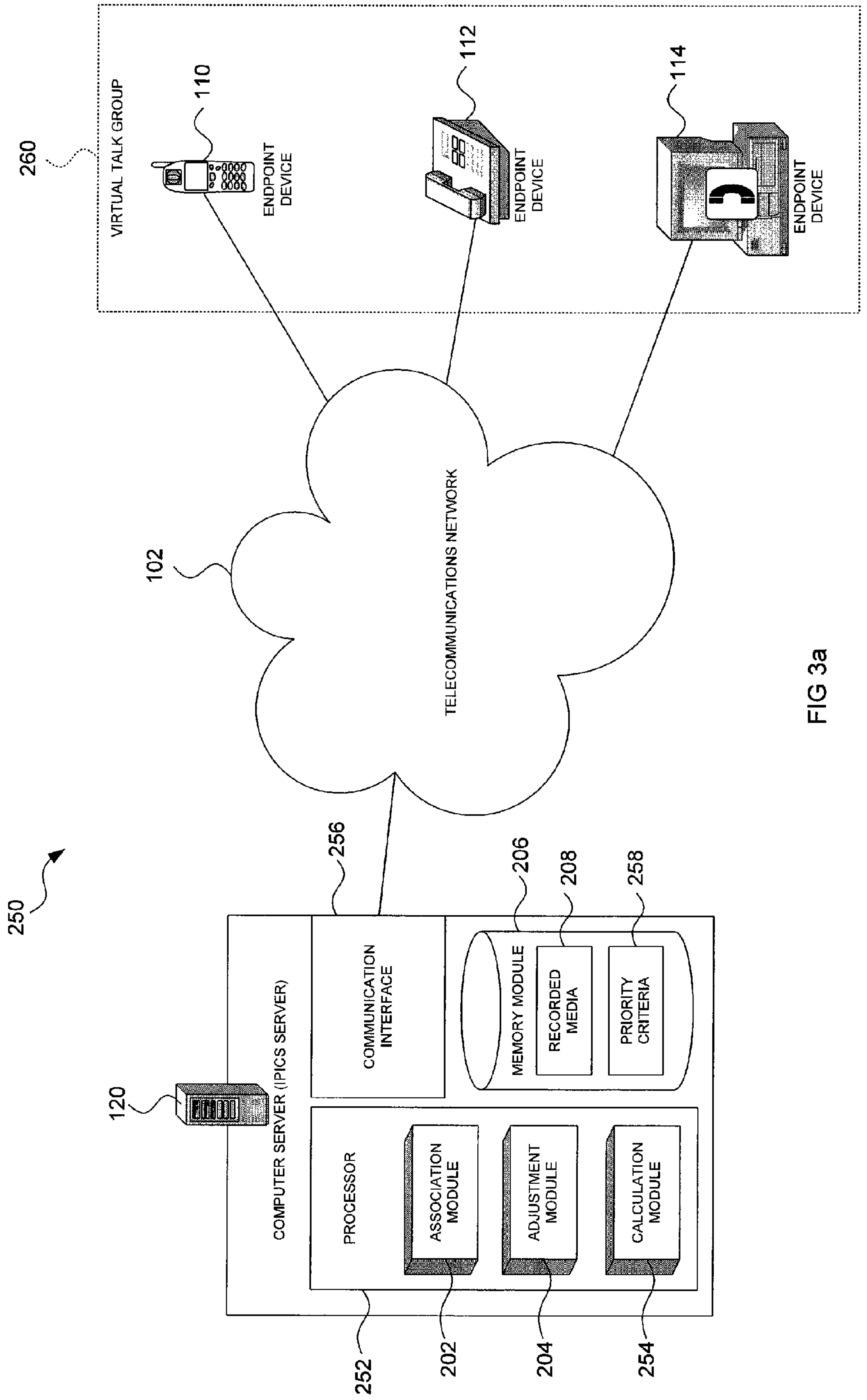
FIG. 3*a* shows a schematic representation of an example embodiment of the system of FIG. 1 in more detail.

FIG. 3*a* shows a system 250 of example detail of the system 100 shown in FIG. 2. As mentioned above, the computer server 120 may embody the computer system 100 of FIG. 2. In particular, the computer system 120 may include a processor 252 (or a plurality of processors) which is programmed to perform functional tasks and is thus shown to be divided into functional modules. It is to be understood that the computer server 120 may therefore include software (e.g. a computer program) to direct the operation of the processor 252. The computer program may optionally be stored on the memory module 206. Although the tasks are shown to be consolidated within a single processor 252, it is to be appreciated that the tasks could instead be distributed among several processes or computer systems.

The computer server 120 may additionally include a calculation module 254 which is operable to calculate or estimate a playing time for the media 208 at a combination of various playing speeds. The calculation module 254 may be operable to calculate a normal playing time (e.g., playback at the same speed that the media was originally played), for example, a playing time of the entire media 208 played at normal (1×) speed. The calculation module 254 may further be operable to calculate a playing time for the media 208 if the entire media 208 is played back at an accelerated speed, for example double (2×) or quad (4×) speed (or any other speed). Further, in accordance with an example embodiment, the calculation module 254 may be operable to calculate a playing time of the media 208 when component segments of the media 208 are played back at various speeds. For instance, the calculation module 254 may be operable to calculate or estimate a playing time of the media 208 if the media segments of a first person (or the speech originating from a first endpoint device) is played back at normal speed, the media segments of the second person is played back at double speed while the media segments of a third person is played back at quad speed. Thus, broadly, in an example embodiment, in response to a playback request, a playback speed of the at least one media segment may be adjusted relative to another media segment.

The computer server 120 may also comprise a communication interface 256, for example in the form of a network communication device (a network card, a wireless access point, or the like). The communication interface 256 may be operable both to receive incoming communications (therefore acting as a receiving arrangement) and to transmit outgoing communications (therefore acting as a transmission or sending arrangement). The communication interface 256 may be operable to connect the computer server 120 to the telecommunications network 102.

In an example embodiment, the computer server 120 may include a priority or priority criteria stored on the memory module 206, the priority criteria being schematically represented by reference 258. The priority criteria 258 may include an identifier of a user or speaker, or alternatively may include an identifier of an endpoint device 110 to 114 (e.g., when the endpoint device is a priority endpoint device). Further, the priority criteria 258 may include a priority or rank associated with each speaker, for example a high priority, a normal priority, a low and a very low priority. In an example embodiment, the priority may be associated with the role or position of the speaker, rather than the speaker himself. Thus, a highway officer may have the highest priority regardless of the identity of the officer. Instead, or in addition, the priority criteria 258 may include a playback speed associated with each speaker or with each role, for example normal (1×) if the speaker is important, fast (1.5×) if the speaker is average, faster (2×) if the speaker is unimportant, and if the speaker is totally irrelevant, his speech portions may be skipped altogether (analogous to an infinite playback speed).

In an example embodiment, the priority criteria 258 may be pre-assigned by a supervisor or network administrator based on importance of the speakers. For example, if one speaker is the CEO of the company, he may be assigned a high priority, a project manager may be assigned a normal priority, while other employees may be assigned a low or very low priority. In one embodiment, the relative importance of the speakers may be stored in a directory (e.g. on memory module 206) and retrieved by the calculation module 254 in real time.

The endpoint devices 110 to 114 are shown by way of example to be part of a VTG schematically indicated by reference numeral 260. The endpoint devices 110 to 114 are thus able to communicate with one another in the VTG 260 in a push-to-talk communication environment.

In an example embodiment, the endpoint devices 110 to 114 may communicate with one another using RTP (Real-time Transport Protocol) which is appropriate for delivering audio and/or video data (or any other low latency data) across a network. The telecommunications network 102 may thus be an RTP compatible network. In such a case, endpoint devices 110 to 114 may also communicate utilizing RTCP (Real-time Transport Control Protocol) which contains control information about the data (e.g. audio) transmitted via RTP. Thus, by examining RTCP packets, e.g. the packet headers, which relate to the push-to-talk communication between endpoint devices 110 to 114, it may be possible to determine from which endpoint device 110 to 114 a particular a media segment originated. Therefore, the association module 202 may be operable to examine or interrogate the RTCP packets thereby to determine a source of each media segment and thereafter to annotate or mark the media segments contained within the media 208 with data indicative of the endpoint device 110 to 114 or the speaker from which the media segment originated.

In an example embodiment, the computer server 120 as mentioned above may be an IPICS server. In such an example case, the IPICS server may include a floor control mechanism which is operable to arbitrate the various push-to-talk speakers. Stated differently, the floor control mechanism may be operable to determine when a speaker may and may not speak. For example, if endpoint device 110 is transmitting media from its speaker, the floor control mechanism will not allow the other endpoint devices 112 and 114 to transmit audio, thus ensuring that there is at most one incoming audio stream. The association module 202 may be operable to determine from the floor control mechanism the source of the media (e.g. incoming audio or speech) in order to associate, in similar fashion to examining RTCP packets, each media segment of the recorded media 208 with an endpoint device 110 to 114 or a speaker from which the media segment originated.

In an example embodiment, a latecomer (e.g., a person joining a VTG after communications have already commenced), or any other person wishing to hear the recorded media 208, may opt to receive a transmission of the media 208. The computer server 120 may therefore include an IVR (Interactive Voice Response) system to provide a user interface on one or more endpoint devices 110 to 114. This user interface may be operable to transmit information about the media 208 and to receive an input, for example a keystroke (e.g., DTMF audio), from the endpoint device 110 to 114. For example, if the user of endpoint device 110 joins the VTG 260 late, he may wish to hear the media 208 to bring him up to date with the conversation or operation. The calculation module 254 may calculate playback times for the media 208, including a playback time for the media 208 played at normal speed and a playback time for the recorded media 208 played at adjusted speeds in accordance with the priority criteria 258 of the speakers from which the various media segment originated. These playback times may be communicated to the endpoint device 110 via the communication interface 256, for example using an appropriate user interface e.g., voice prompts, text message, screen popup etc. The communication interface 256 may then be operable to receive a communication indicative of a keystroke from the endpoint device 110 to indicate the selection of one of the playback options. In an example embodiment, speakers or users may be able to assign priority criteria 258 to the other speakers from their endpoint devices 110 to 114 (described further by way of example below).

Figure 3B:
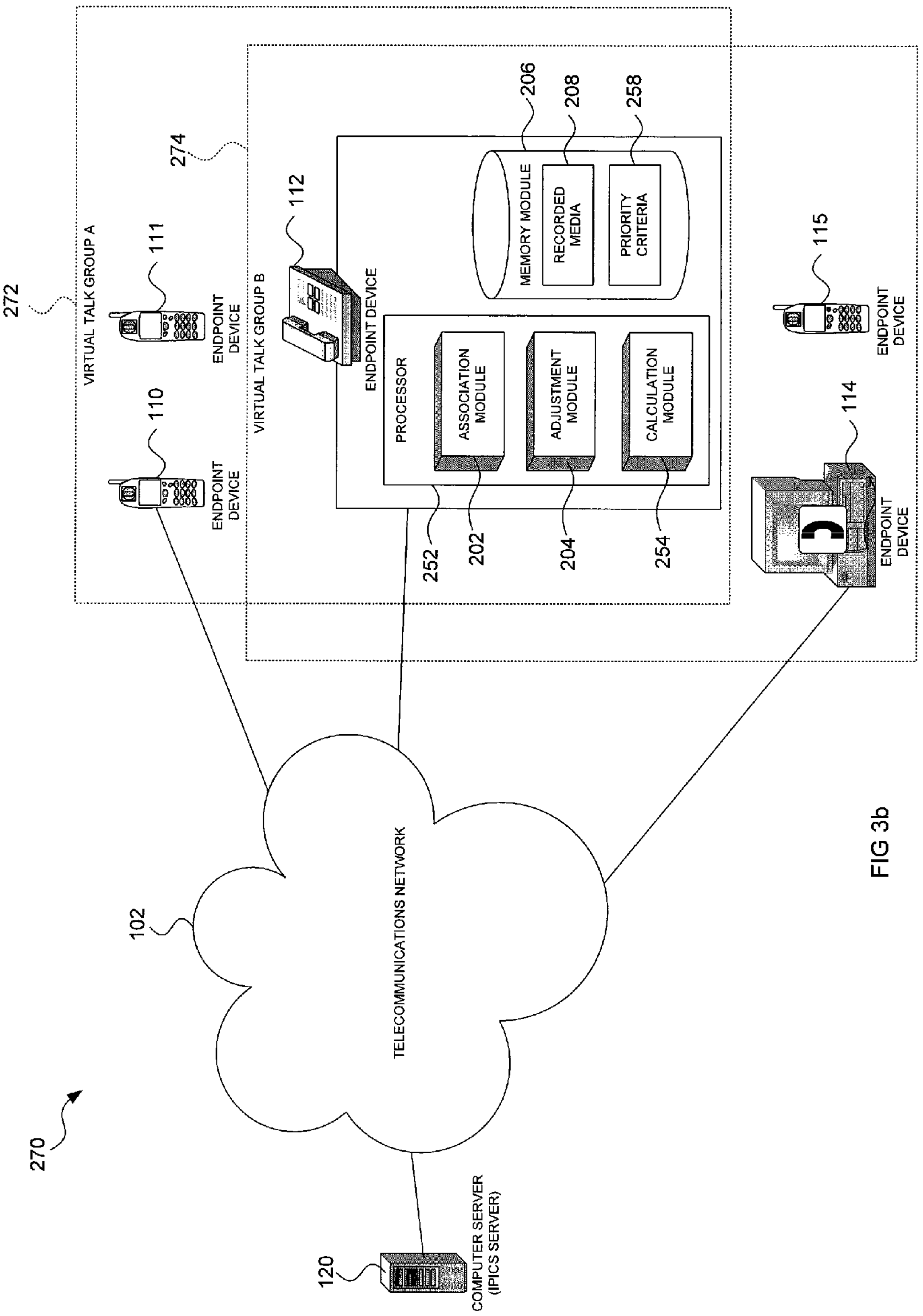
FIG. 3*b* shows a schematic representation of an example embodiment of the system of FIG. 1 in more detail.

Referring now to FIG. 3*b*, a system in accordance with an example embodiment is indicated by reference numeral 270. The system 270 is similar to system 250, except that the functional modules 202, 204 and 254 and the memory module 206 are embedded within the endpoint device 112. Thus, in this example, the endpoint device 112 may embody the computer system 200 of FIG. 2. This example embodiment may find application in, but is not limited to, the situation where a speaker, via his endpoint device, is simultaneously involved in two independent VTGs, for example VTG A 272 and VTG B 274. Thus, endpoint devices 110 to 112 are shown by way of example to form part of VTG A 272, while endpoint devices 112, 114, 115 are shown by way of example to form part of VTG B 274.

While the user of endpoint device 112 is speaking and listening to VTG A 272, it may be inconvenient or impossible for him to pay attention to the conversation occurring in VTG B 274. Thus, in accordance with an example embodiment, the endpoint device 112 records the speech of VTG B 274, for example between endpoint devices 114 and 115. When the user of endpoint device 112 is able to direct his attention away from VTG A 272 towards VTG B 274, he may need to catch up on the conversation which he missed.

Figure 4:
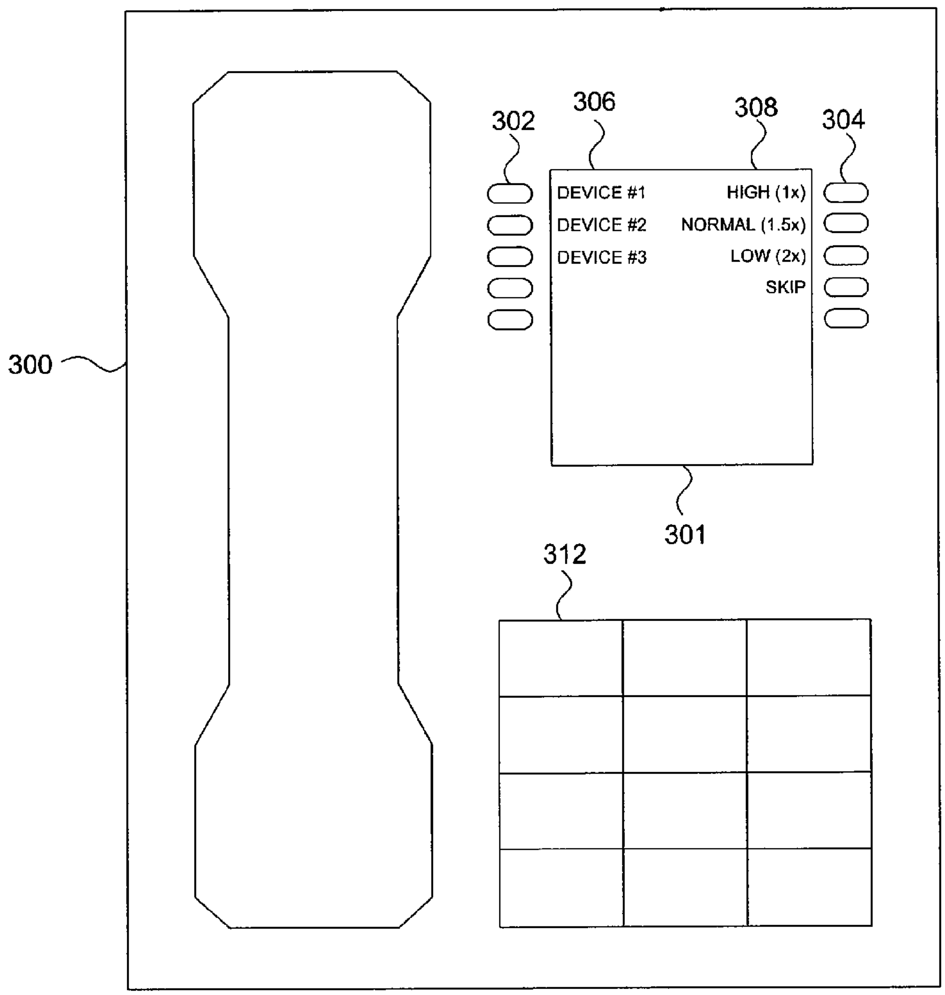
FIG. 4 shows a schematic representation of a user interface in accordance with an example embodiment.

In accordance with an example embodiment, the endpoint device 112 (or any other endpoint device) may include a user interface, for example a TUI (Telephony User Interface) or a GUI (Graphical User Interface). Referring now also to FIG. 4, an example endpoint device 300 is shown to include a user interface. It is to be appreciated that the user interface may vary from one endpoint device to another and, in the case of a computer with a telephony interface, may be in the form of a selection menu displayable on a display screen of the computer.

The endpoint device 300 may include a display screen 301 and a plurality of user selectable buttons 302, 304 (e.g. soft keys) on either side of the display screen 301. For example, the buttons 302 on the left-hand side of the display screen may be respectively associated, in use, with other endpoint devices 306 forming part of a VTG, while the buttons 304 on the right-hand side may be associated with a priority or playback speed 308. By first selecting a device 306 and then assigning a priority 308 to the device 306, a user of the endpoint device 300 may select and assign priorities to users or speakers in accordance with his preferences. The user interface thus acts as a receiving arrangement which is operable to receive a user input indicative of priority criteria to be assigned to other speakers. Instead, a user of the endpoint device 300 may use a conventional keypad 312 to input his selection of priority criteria in response to, for example, voice prompts.

Thus, when the user of endpoint device 112 directs his attention towards VTG B 274, he may choose to assign various priority criteria to the other endpoint devices 114, 115 forming part of VTG B 274, so that the user, when hearing playback of the recorded media 208, may decrease the total playback time by fast forwarding through less important users. It should be understood that other user interfaces may be provided. For example, user of a soft client on a PC may employ richer text, web, pop-up, etc. interfaces to achieve the functions described above.

Figure 5A:
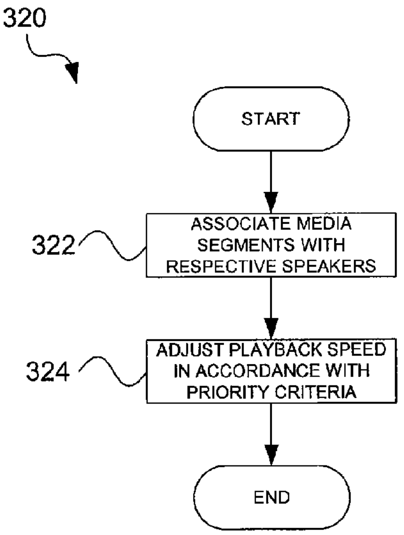
FIG. 5*a* shows, in high-level flow diagram form, an example of a method, in accordance with an example embodiment, for controlling playback of recorded media in a push-to-talk communication environment.
Figure 5B:
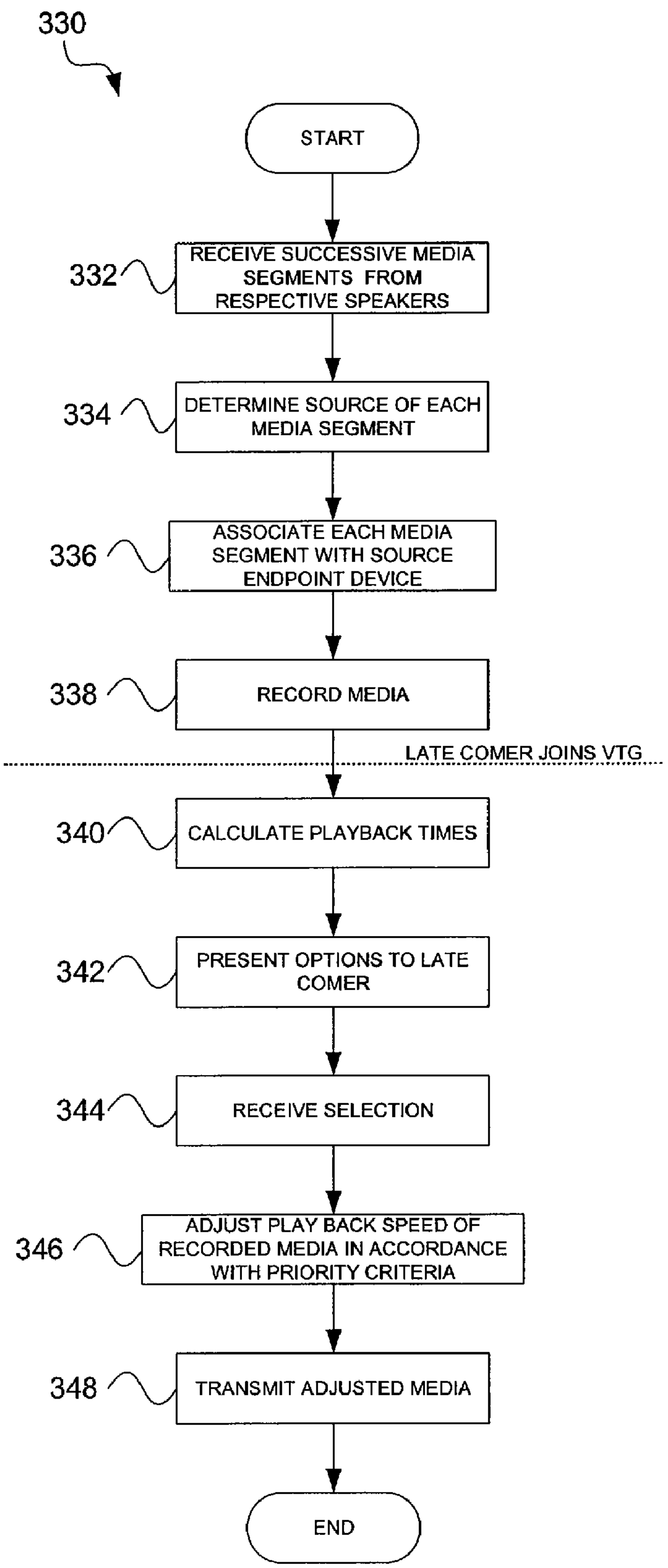
FIGS. 5*b* and 5*c* show, in low-level flow diagram form, examples of a method, in accordance with an example embodiment, for controlling playback of recorded media in a push-to-talk communication environment.
Figure 5C:
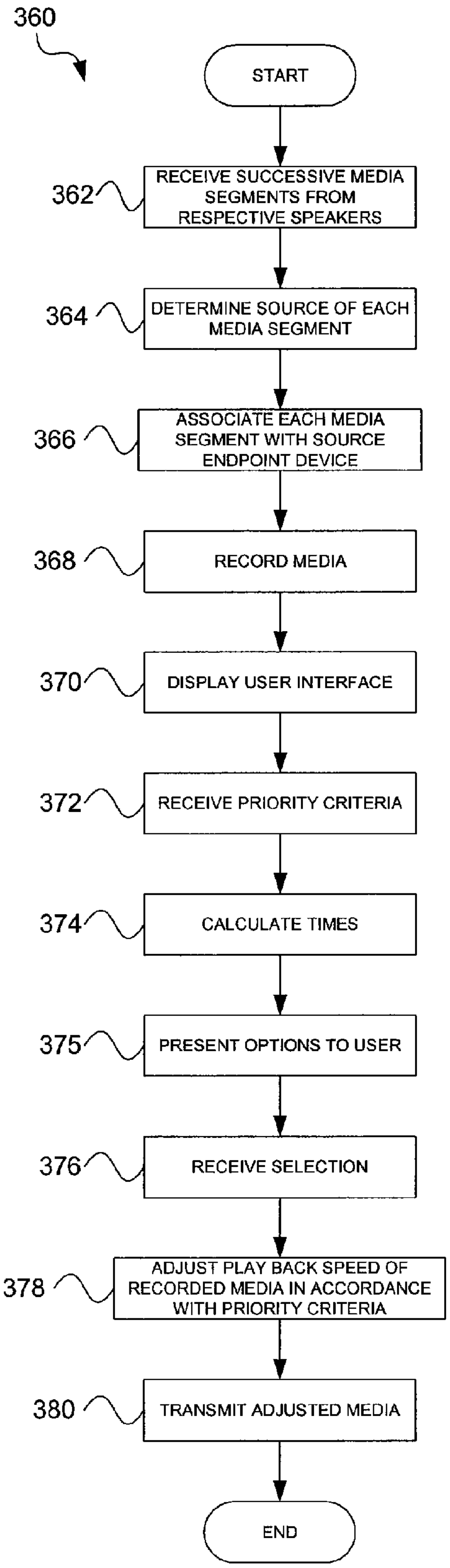

Example embodiments will now be further described in use with reference to FIGS. 5*a* to 5*c*. FIG. 5*a* shows a high-level flow diagram of a method 320, in accordance with an example embodiment, for controlling playback of recorded media in a push-to-talk communication environment. The method 320 comprises associating, at block 322, media segments with an endpoint device (or with a speaker) from which the respective media segments originated. When the media, which comprises the successive media segments, is played back, respective playback speeds of the media segments are automatically adjusted, at block 324, in accordance with priority criteria assigned to the endpoint devices (or the speakers) from which the media segments originated.

FIG. 5*b* shows a low-level flow diagram of a method 330, in accordance with the example embodiment, for controlling playback of recorded media in a push-to-talk communication environment. For ease of description, the method 330 will be further described with reference to the system 250 of FIG. 3*a*, but it is to be appreciated that the method of 330 is not limited to any particular system configuration.

For example, users of two endpoint devices 110 and 112 may join a common VTG 260, via a push-to-talk compatible telecommunications network 102, thereby to communicate with each other in a push-to-talk environment. The VTG 260 may be hosted or presented by computer server 120. By way of example, the VTG 260 may be a safety and security operations channel, for example a channel of a police department. The users of the endpoint devices 110 and 112 therefore may be communicating with each other about police related business or incidents.

The computer server 120 may then receive, at block 332, successive media segments from the endpoint devices 110 and 112, one at a time. The computer server 120 may receive the media in the form of IP packets via communication interface 256 which thus acts as a receiving arrangement.

The association module 202 may be operable to determine, at block 334, a source from which each media segment originated. If the telecommunications network 102 is employing RTCP, the association module 202 may be operable to interrogate an RTCP packet thereby to determine an identifier indicative of the endpoint device 110 and 112 from which the media, audio or data, as contained in RTCP packets, originated. Instead, or in addition, if the computer server 120 is an IPICS server, it may employ a floor control mechanism which is operable to identify the source of incoming media segments.

Once the source endpoint device of an incoming media segment has been identified, the source endpoint device (e.g. endpoint device 110) is associated, at block 336, with that media segment. This association may be done by annotating or tagging the media segment with data indicative of the source of that media segment, or by keeping a log (e.g. in the form of Metadata) of incoming media. The successive media segments are then appended sequentially one after another and recorded, at block 338, on the memory module 206 for later playback. In accordance with one embodiment, the computer server 120 may record and store the associated metadata along with the recorded media 208.

By way of example, user of the endpoint device 114 may join the VTG 260 after an initial two users have already exchanged correspondence. He is therefore a latecomer, and may wish to be updated on the progress of the police operation. In response to the latecomer joining the VTG 260, the calculation module 254 calculates, at block 340, playback times of the recorded media 208 based on various playback speeds.

In this example embodiment, the priority criteria 258 are predefined by a system administrator. However, the priority criteria 258 could be assigned by a user (see further below). For example, the user of endpoint device 110 could be the chief of police, and would thus be the principal of the VTG 260. He may be assigned a high priority (1×) and playback of his segments of media or speech may thus be played back at normal speed. The user of endpoint device 112 may be a regular policeman, thus being assigned an average priority (1.5×) or a low priority (2×) and segments of his speech may be played back at increased speed. For illustrative purposes, the segments of speech from the chief of police (from endpoint device 110) may have a total duration of one minute, while the segments of speech from the regular policeman (from endpoint device 112) may have a total duration of two minutes. In such a case, the calculation module 254 may calculate that the total playback time for the recorded media 208 played at normal speed in its entirety would be three minutes (one minute+two minutes). The calculation module 254 may then further calculate that the total playback time for the recorded media 208 played back at a speed adjusted in accordance with the priority criteria 258 would be two minutes–one minute for the chief of police and one minute (two minutes played back at increased (e.g. double) speed) for the regular policeman.

The latecomer may then be presented, for example via prompts from a user interface, with a number of playback options to play back the recorded media 208. A first option may be to play the entire recorded media 208 at normal speed, while a second option may be to play the recorded media 208 at speeds adjusted in accordance with the priority criteria 258. The latecomer may input his response, for example via the keypad 312 of his endpoint device 114, to select one of the presented options.

The computer server 120 receives, at block 344, the selected option, for example via a PC based graphical user interface, and the adjustment module 204 adjusts the playback speed of the recorded media 208 accordingly. If the option to playback the recorded media 208 adjusted in accordance with the priority criteria 258 was selected (for a total playback duration of two minutes), the adjustment module 204 may be operable to determine which media segments are associated with each endpoint device 110 and 112 by interrogating the annotated or tagged data and thereafter to adjust, at block 346, the playback speed of those media segments accordingly. The recorded media 208 having adjusted playback speeds is then transmitted, at block 348, to the endpoint device 114 of the latecomer, so that the latecomer can be updated and then contribute to the conversation.

Referring now to FIG. 5*c*, a low-level flow diagram of a method 360, in accordance with the example embodiment, for controlling playback of recorded media in a push-to-talk communication environment is shown. For ease of description, the method 360 will be further described with reference to the system 270 of FIG. 3*b*, but it is to be appreciated that the method of 360 is not limited to any particular system configuration. Unless otherwise indicated, like numerals to FIG. 5*b* refer to like operations.

Operations 362 to 368 of method 360 are similar to operations 332 to 338 of method 330, however, in accordance with an example embodiment, the operations 362 to 368 of method 360 are performed by the endpoint device 112. Although not illustrated, some operations could be done by the computer server 120, while other operations could be done by one or more of the endpoint devices.

This example embodiment may find application when the user of endpoint device 112 is simultaneously logged onto two or more independent VTGs. For example, the user could be a dispatcher who needs to listen to multiple channels simultaneously to co-ordinate rescue efforts. Thus, VTG A 272 could be a police services channel, while VTG B 274 could be a fire services channel. While the dispatcher is listening to the conversation of VTG A 272 his attention is diverted away from VTG B 274. However, in accordance with an example embodiment, the speech of both VTGs is being recorded by the endpoint device 112. It will thus be understood that the media of each VTGs may be separately recorded and stored on the memory module 206.

When the dispatcher directs his attention to VTG B 274, he needs to know what had transpired when his attention was elsewhere. He thus invokes a user interface similar to that of FIG. 4 on his endpoint device 112, and the user interface is then displayed, at block 370, by the endpoint device 112. The user interface may allow him to assign custom priority criteria 256 to the endpoint devices 114 and 115. For example, even though the user of telephony endpoint 114 may be the principle of VTG B 274, the dispatcher may be more interested in what the other user, for example being an agent in the field, of telephony endpoint 115 has to say. He may therefore assign a higher priority to endpoint device 115 and a lower priority to endpoint device 114. The endpoint device 112 receives, at block 372, input indicative of priority criteria 358 in accordance with the buttons 302 and 304 selected by the dispatcher. Again, it is to be understood that separate priority criteria 258 may be assigned to respective endpoint devices of each user for each VTG.

Operations 374 to 380 of method 360 are similar to corresponding operations 340 to 348 of method 330, except that they are performed by the endpoint device 112.

Figure 6:
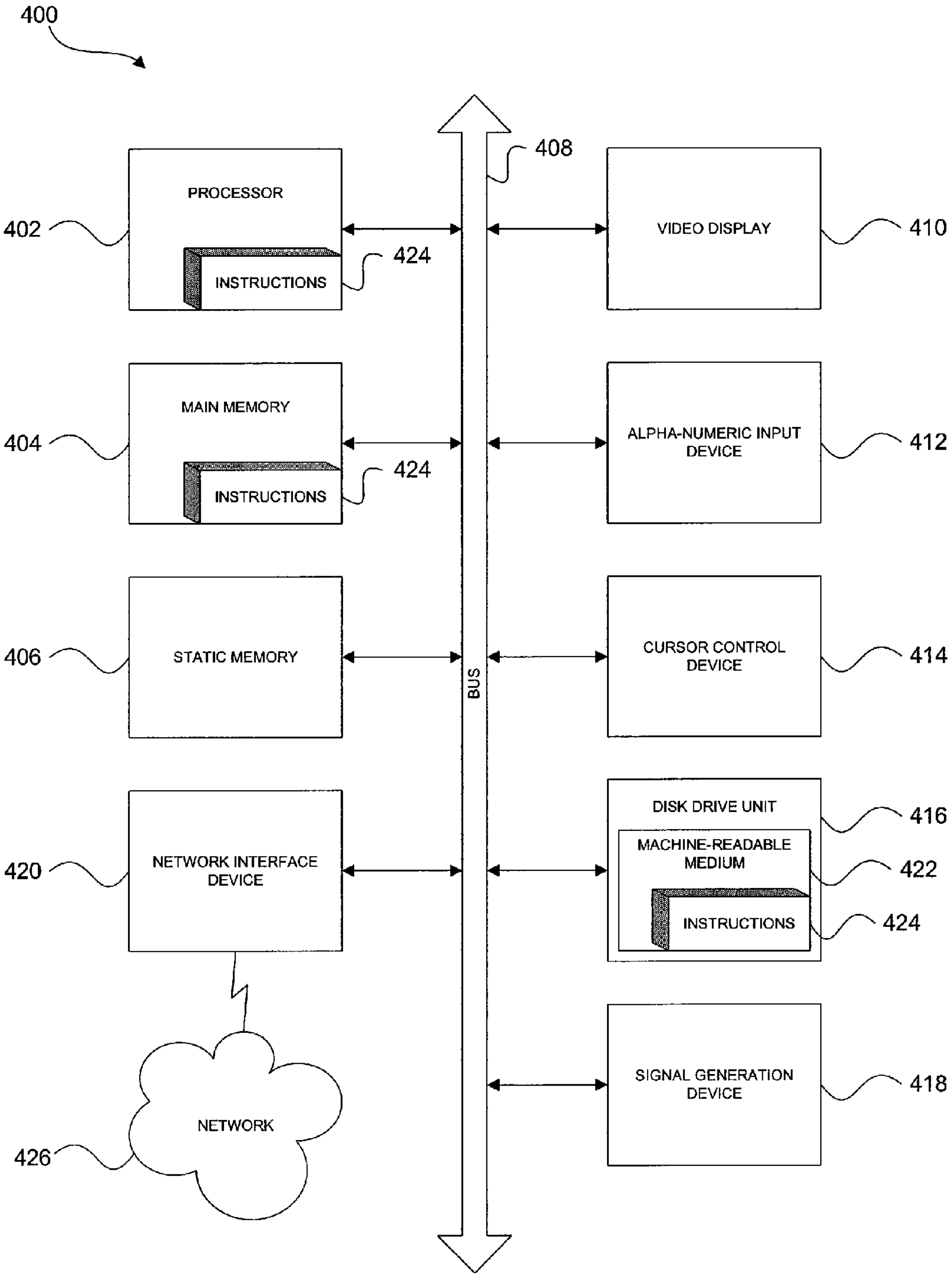
FIG. 6 shows a diagrammatic representation of a machine in the example form of a computer system in which a set of instructions for causing the machine to perform any one or more of the methodologies discussed herein, may be executed.

FIG. 6 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD), plasma display, or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., HTTP, FTP).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The example embodiments may present a time efficient way of listening to recorded media in a push-to-talk communication environment. Playback speed of the various media segments may automatically be adjusted in accordance with priority criteria. Further, the priority criteria may be chosen depending on particular operational requirements of users. Also, expected playback times may be calculated and reported to users, so that they know how long it will take to listen to the playback of the recorded media at various playback speeds.

What is claimed is:

1. A method comprising:

recording a push-to-talk communication session comprising media segments, each media segment being associated with an endpoint device from which the media segment originated;

receiving a playback request for playback of at least one recorded media segment at an adjusted playback speed;

in response to the playback request, adjusting a playback speed of the at least one recorded media segment relative to another recorded media segment; and providing recorded media including the media segment with the adjusted playback speed to or at a requesting endpoint device.

2. The method of claim 1, further comprising:

assigning a priority to recorded media segments associated with a priority endpoint device;

providing the recorded media segments with the priority at a first playback speed at the requesting endpoint device; and providing the other recorded media segments at a second playback speed at the requesting endpoint device, the second playback speed being faster than the first playback speed.

3. The method of claim 2, wherein the first playback speed is a normal playback speed in which the media is played back at the speed at which it was originally recorded.

4. The method of claim 2, comprising assigning the priority to an endpoint in accordance with a role performed by a person using the endpoint device.

5. The method of claim 2, comprising:

receiving a communication from the requesting endpoint device that identifies the priority endpoint device; and assigning the priority to the priority endpoint device.

6. The method of claim 2, comprising assigning the priority based on Real Time Control Protocol (RTCP) communications or on a floor control mechanism.

7. The method of claim 2, comprising:

displaying a user interface on a endpoint device that provides a user with an option to adjust the playback speed of the at least one recorded media segment; and receiving a user input that identifies the at least one recorded media segment.

8. The method of claim 1, comprising:

recording the push-to-talk communication session at each endpoint device in a Virtual Talk Group; and adjusting the playback speed of the at least one recorded media segment at the endpoint device.

9. The method of claim 1, comprising:

recording the push-to-talk communication session at a central server facilitating a Virtual Talk Group;

adjusting the playback speed of the at least one recorded media segment at the central server; and communicating the recorded media including the media segment with the adjusted playback speed to the requesting endpoint device.

10. The method of claim 1, comprising:

calculating an estimated duration of playback of the recorded media before adjustment and an estimated duration of playback of the recorded media after adjustment; and providing the estimated durations to a user of the requesting endpoint device.

11. An endpoint device comprising:

a recording module to record a push-to-talk communication session comprising media segments, each media segment being associated with an endpoint device from which the media segment originated;

an interface to receive a playback request for playback of at least one recorded media segment at an adjusted playback speed;

an adjustment module to, in response to the playback request, adjust a playback speed of the at least one recorded media segment relative to another recorded media segment; and a playback module provide the recorded media including the segment with the adjusted playback speed at the endpoint device.

12. The endpoint device of claim 11, wherein a priority is assigned to recorded media segments associated with a priority endpoint device, the adjustment module being configured to provide the recorded media segments with the priority at a first playback speed at the endpoint device, and provide the other recorded media segments at a second playback speed at the endpoint device, the second playback speed being faster than the first playback speed.

13. The endpoint device of claim 12, wherein the first playback speed is a normal playback speed in which the media is played back at the speed at which it was originally recorded.

14. The endpoint device of claim 12, wherein the priority is assigned to an endpoint associated with role performed by a person in a virtual talk group.

15. The endpoint device of claim 12, wherein the priority is assigned based on Real Time Control Protocol (RTCP) communications or on a floor control mechanism.

16. The endpoint device of claim 12, comprising:

a display to provide a user interface that provides a user with an option to adjust the playback speed of the at last one recorded media segment; and an input arrangement providing the interface to receive a user input that identifies the at least one recorded media segment.

17. The endpoint device of claim 11, which comprises a calculation module configured to:

calculate an estimated duration of playback of the recorded media before adjustment and an estimated duration of playback of the recorded media after adjustment; and provide the estimated durations to the user of the endpoint device.

18. A server comprising:

a network interface to interface to a plurality of endpoints configured to participate in a push-to-talk communication session;

a recorder to record the push-to-talk communication session, the push-to-talk session comprising media segments, each media segment being associated with an endpoint device from which the media segment originated; and one or more processors configured to:

receive a playback request for playback of at least one recorded media segment at an adjusted playback speed from a requesting endpoint device;

in response to the playback request, adjust a playback speed of the at least one recorded media segment relative to another recorded media segment; and communicate the recorded media including the segments with the adjusted playback speed to the requesting endpoint device.

19. The server of claim 18, wherein the one or more processors are configured to:

assign a priority to recorded media segments associated with a priority endpoint device;

communicate the recorded media segments with the priority at a first playback speed to the requesting endpoint device; and communicate the other recorded media segments at a second playback speed to the requesting endpoint device, the second playback speed being faster than the first playback speed.

20. The server of claim 19, wherein the first playback speed is a normal playback speed in which the media is played back at the speed at which it was originally recorded.

21. The server of claim 19, wherein the one or more processors are configured to assign the priority to an endpoint device in accordance with a role performed by a person using that endpoint device.

22. The server of claim 19, wherein the one or more processors are configured to:

receive a communication from the requesting endpoint device that identifies the priority endpoint device; and assign the priority to the priority endpoint device.

23. The server of claim 19, wherein the one or more processors are configured to assign the priority based on Real Time Control Protocol (RTCP) communications or on a floor control mechanism.

24. The server of claim 18, wherein the one or more processors are configured to:

calculate an estimated duration of playback of the recorded media segment before adjustment and an estimated duration of playback of the recorded media after adjustment; and communicate the estimated durations to the requesting endpoint device.

25. Apparatus comprising:

means for recording a push-to-talk communication session comprising media segments, each media segment being associated with an endpoint device from which the media segment originated;

means for receiving a playback request for playback of at least one recorded media segment at an adjusted playback speed;

means for adjusting a playback speed of the at least one recorded media segment relative to another recorded media segment in response to the playback request; and means for providing the recorded media including the segments with the adjusted playback speed to or at a requesting endpoint device.

* * * * *